US012623746B1

(12) United States Patent
Dai

(10) Patent No.: US 12,623,746 B1
(45) Date of Patent: May 12, 2026

(54) ELECTRIC MOTORCYCLE

(71) Applicant: Dongguan Hongling Intelligent Technology Co., Ltd., Dongguan (CN)

(72) Inventor: Honglin Dai, Yiyang (CN)

(73) Assignee: Dongguan Hongling Intelligent Technology Co., Ltd., Dongguan (CN)

( * ) Notice: Subject to any disclaimer, the term of this patent is extended or adjusted under 35 U.S.C. 154(b) by 0 days.

(21) Appl. No.: 19/241,782

(22) Filed: Jun. 18, 2025

(51) Int. Cl.
B62K 11/02 (2006.01)
B62J 43/16 (2020.01)
(52) U.S. Cl.
CPC .............. B62K 11/02 (2013.01); B62J 43/16 (2020.02); *B62K 2204/00* (2013.01)
(58) Field of Classification Search
CPC ....... B62K 11/02; B62K 2204/00; B62J 43/16
See application file for complete search history.

(56) References Cited

U.S. PATENT DOCUMENTS

| | | | | | |
|---|---|---|---|---|---|
| 7,503,575 | B2 * | 3/2009 | Kurokawa | ............. | B62K 19/32 |
| | | | | | 280/281.1 |
| 2008/0223648 | A1 * | 9/2008 | Shiraishi | ................ | B62K 11/04 |
| | | | | | 180/311 |

FOREIGN PATENT DOCUMENTS

| | | | | | |
|---|---|---|---|---|---|
| CA | 3087548 | A1 * | 1/2021 | .............. | B62J 45/42 |
| CN | 206719432 | U * | 12/2017 | | |
| CN | 206719451 | U * | 12/2017 | | |
| DE | 102013214588 | A1 * | 1/2015 | ............. | B62K 19/10 |
| DE | 102019107110 | A1 * | 10/2019 | ............. | B62K 19/24 |

* cited by examiner

*Primary Examiner* — Jacob D Knutson
(74) *Attorney, Agent, or Firm* — Law Offices of Sandy Lipkin; Sandy Lipkin

(57) ABSTRACT

An electric motorcycle includes a motorcycle main body, a battery, and at least one battery fixing device. The battery is configured to be installed on the motorcycle main body. The battery fixing device is connected to the motorcycle main body. The battery fixing device includes a fixing plate, a control end, an abutting end, and a connecting end. The fixing plate is connected to the motorcycle main body. The connecting end is rotatably connected to the fixing plate. One end of the connecting end is connected to the abutting end, and an opposite end of the connecting end is connected to the control end. The fixing plate is used for covering the battery. The abutting end is configured to abut against and secure the battery. The control end is operated to make the abutting end approach or move away from the battery.

18 Claims, 14 Drawing Sheets

ELECTRIC MOTORCYCLE

CROSS-REFERENCE TO RELATED APPLICATIONS

Technical Field

The present invention relates to the field of electric vehicles, particularly to an electric motorcycle.

Background Art

With the enhancement of environmental awareness and the increasing urban traffic pressure, electric motorcycles have emerged and become popular due to their environmental protection and convenience. Most electric motorcycles currently on the market use traditional battery compartments to fix the battery, resulting in difficult disassembly, installation, and fixation of the battery. Moreover, the motors of most electric motorcycles are exposed to the outside, and long-term use causes the motors to become dirty or knocked. The seats of most electric motorcycles are fixed to the frame with screws, making later replacement time-consuming and labor-intensive. The messy routing of control wires in most electric motorcycles leads to unsightliness or damage during use. To this end, the present invention provides an electric motorcycle, which can effectively solve the above problems.

SUMMARY

In order to overcome the shortcomings of the prior art, the present invention provides an electric motorcycle. The electric motorcycle includes a motorcycle main body, a battery, and at least one battery fixing device. The battery is configured to be installed on the motorcycle main body. The battery fixing device is connected to the motorcycle main body.

The battery fixing device includes a fixing plate, a control end, an abutting end, and a connecting end. The fixing plate is connected to the motorcycle main body. The connecting end is rotatably connected to the fixing plate. One end of the connecting end is connected to the abutting end, and an opposite end of the connecting end is connected to the control end. The fixing plate is used for covering the battery. The abutting end is configured to abut against and secure the battery. The control end is operated to make the abutting end approach or move away from the battery.

Furthermore, the control end includes a plurality of protrusions. The control end further includes a plurality of hollow structures.

Furthermore, the motorcycle main body includes a frame. An accommodating space is defined in the frame. The battery is arranged in the accommodating space. The battery fixing device further includes a base. The fixing plate is rotatably connected to the base, and the base is connected to the frame.

Furthermore, the base includes first connecting arms. The fixing plate includes second connecting arms. The battery fixing device further includes a connecting shaft. The first connecting arm and the second connecting arm are connected via the connecting shaft.

Furthermore, the fixing plate further includes a first through hole and a nut. The nut includes a thread, and the connecting end includes a thread. The connecting end is configured to pass through the first through hole and is rotatably connected to the nut.

Furthermore, the battery fixing device further includes a sleeve, at least one locking key, and an elastic member. The locking key and the elastic member are arranged inside the sleeve, and the locking key is configured to compress the elastic member. A first end of the locking key protrudes from the sleeve. The first end is configured to be engaged with an external hole to prevent the battery fixing device from rotating.

Furthermore, a total number of the locking keys is two.

Furthermore, an end of the locking key away from a first end is a second end. The locking key includes a lever. The lever is arranged at the second end. The sleeve includes position limiting holes. A total number of the position limiting holes is two. The lever is arranged in the position limiting hole.

Furthermore, the second ends of the two locking keys abut against the elastic member, so that the elastic member is compressed.

Furthermore, the motorcycle main body includes a frame and a seating portion. The seating portion is detachably mounted on the frame. The seating portion includes at least one mounting rod. The frame includes at least one mounting hole. The seating portion is mounted on the frame, and the mounting rod is configured to pass through the mounting hole. The seating portion further includes a fixing member. The fixing member is detachably connected to the mounting rod to lock the seating portion onto the frame.

Furthermore, the mounting rod is provided with a thread, and the fixing member includes a thread. The fixing member is rotatably connected to the mounting rod.

Furthermore, the seating portion further includes a hanging rope. One end of the hanging rope is connected to the seating portion, and an opposite end of the hanging rope is connected to the fixing member.

Furthermore, the seating portion includes a seat cushion and a supporting seat. The seat cushion is positioned above the supporting seat. The supporting seat is detachably connected to the frame. The supporting seat includes a first connecting component. The first connecting component is positioned at an edge of the supporting seat. The first connecting component includes a first clamping groove. The frame includes a first crossbeam. The first crossbeam is configured to be clamped in the first clamping groove. The first connecting component includes a plurality of supporting members disposed at intervals.

Furthermore, the supporting seat further includes a second connecting component. The second connecting component includes a second clamping groove. The frame further includes a second crossbeam. The second crossbeam is configured to be clamped in the second clamping groove.

Furthermore, the motorcycle main body further includes a frame, a motor, and a motor protection structure. The motor is arranged on the frame to drive the electric motorcycle. The motor protection structure is arranged outside the motor to protect the motor. The motor protection structure is connected to the frame.

Furthermore, the motor protection structure includes first protection plates disposed on an upper side and a lower side of the motor, second protection plates disposed on a left side and a right side of the motor, and a third protection plate disposed on a front side of the motor. The first protection plate includes a plurality of heat conduction grooves. The third protection plate includes a second through hole for wiring.

Furthermore, the motorcycle main body further includes a frame, a connecting portion, a steering component, a motor, and a brake component. One end of the connecting portion is connected to the frame, and an opposite end of the connecting portion is connected to the steering component. Two sides of the connecting portion include inwardly recessed avoidance grooves. The connecting portion is made of aluminum alloy. The steering component includes a steering shaft and a control wire. The control wire is connected to the motor and the brake component. The steering shaft includes a wiring channel, and the control wire is configured to pass through the wiring channel.

Furthermore, the steering component further includes a handlebar, a control component, a front fork arm, and a front shock absorber. The motorcycle main body further includes a front wheel. The control component is arranged on the handlebar. The control component is connected to the control wire to control the motor and the brake component. The front fork arm, the handlebar, and the steering shaft are connected. One end of the front shock absorber is connected to the front wheel, and an opposite end of the front shock absorber is connected to the front fork arm. The brake component is arranged on the front wheel. The front fork arm is not perpendicular to the ground.

Furthermore, the motorcycle main body further includes a rear wheel, a rear fork arm, and a rear shock absorber. One end of the rear fork arm is connected to the frame, and an opposite end of the rear fork arm is connected to the rear wheel. One end of the rear shock absorber is connected to the frame, and an opposite end of the rear shock absorber is connected to the rear fork arm. The brake component is arranged on the rear wheel. The motorcycle main body further includes a supporting foot. The supporting foot is rotatably connected to the frame to support the electric motorcycle. The motorcycle main body further includes a pedal. The pedal is arranged on the frame. The motorcycle main body further includes a front fender and a rear fender.

Furthermore, the motorcycle main body further includes a frame, a connecting portion, and a steering component. One end of the connecting portion is connected to the frame, and an opposite end of the connecting portion is connected to the steering component. Two sides of the connecting portion include inwardly recessed avoidance grooves. The connecting portion is made of aluminum alloy.

Beneficial effects of the present invention are as follows. The present invention provides an electric motorcycle. The battery is fixed in the accommodating space of the frame by the battery fixing device. The battery fixing device includes the fixing plate. The fixing plate is rotatably connected to the frame. The fixing plate is provided with the control end, the abutting end, and the connecting end. Rotating the control end causes the abutting end to press against the battery, thereby securing the battery within the frame. Rotating the control end in an opposite direction allows the abutting end to move away from the battery. Through the above structural arrangement, the dynamic adjustment of battery fixation is achieved, allowing the position of the abutting end to be adjusted according to batteries of different sizes or different usage scenarios, thereby enhancing user convenience. The combination of the locking key and the elastic member facilitates the opening and closing of the fixing plate by the user. The seating portion is installed on the frame by connecting the fixing member with the mounting rod, making it more time-saving and effortless for the user to disassemble the seating portion. The motor is arranged in the motor protection structure, which can better protect the motor and prevent the motor from being easily damaged. The steering shaft includes the wiring channel, and the control wire is arranged in the wiring channel to make the wiring of the control wire more concealed, increase aesthetics, and better protect the control wire. The front fork arm is positioned on both sides of the connecting portion. Both sides of the connecting portion are provided with the inwardly recessed avoidance grooves, which can provide a larger range of movement for the front fork arm during steering, thereby increasing the steering angle of the electric motorcycle.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

Figure 13:
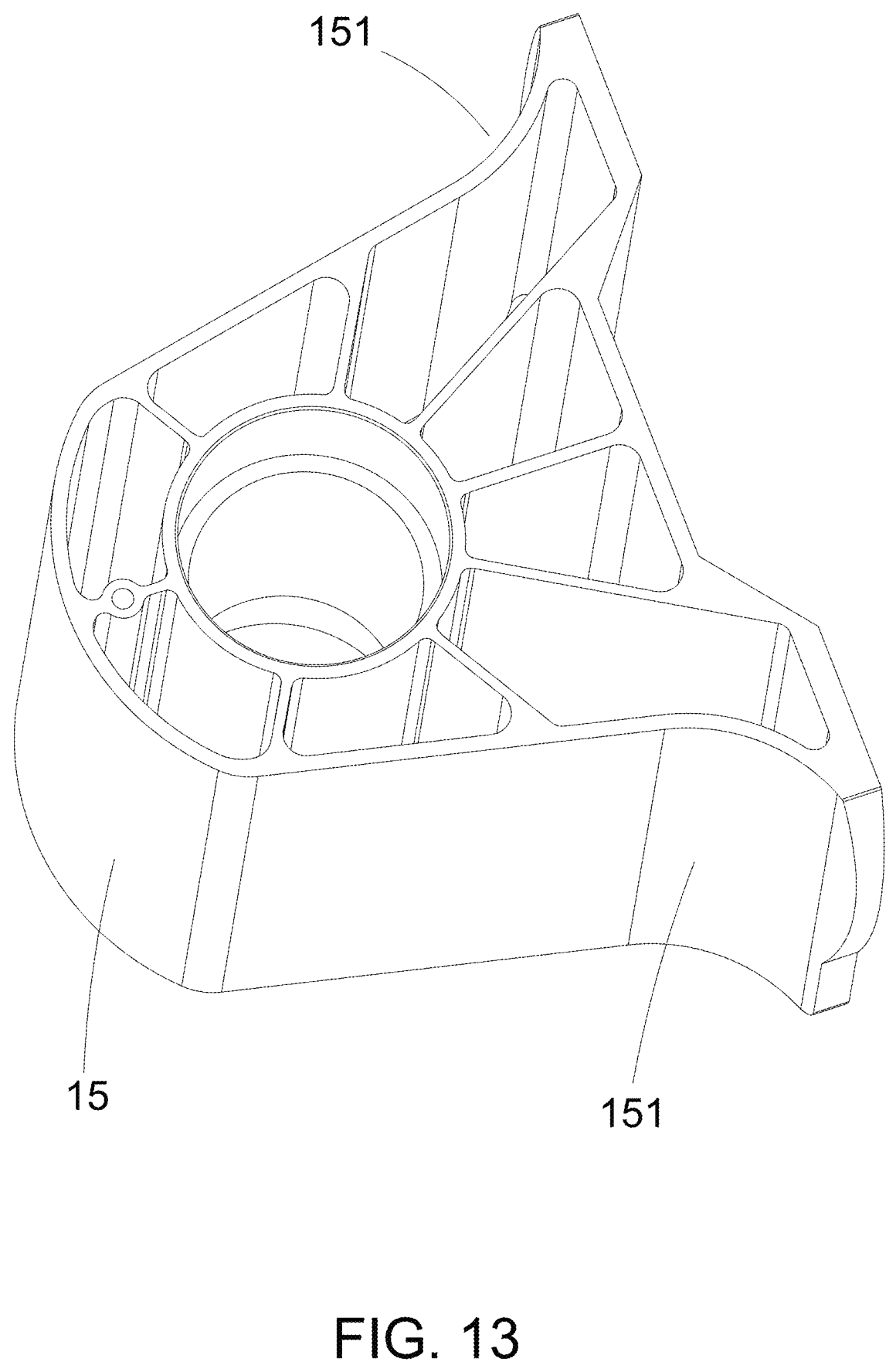

FIG. 13 is a perspective view of a connecting portion.

DETAILED DESCRIPTION OF THE EMBODIMENTS

Figure 1:
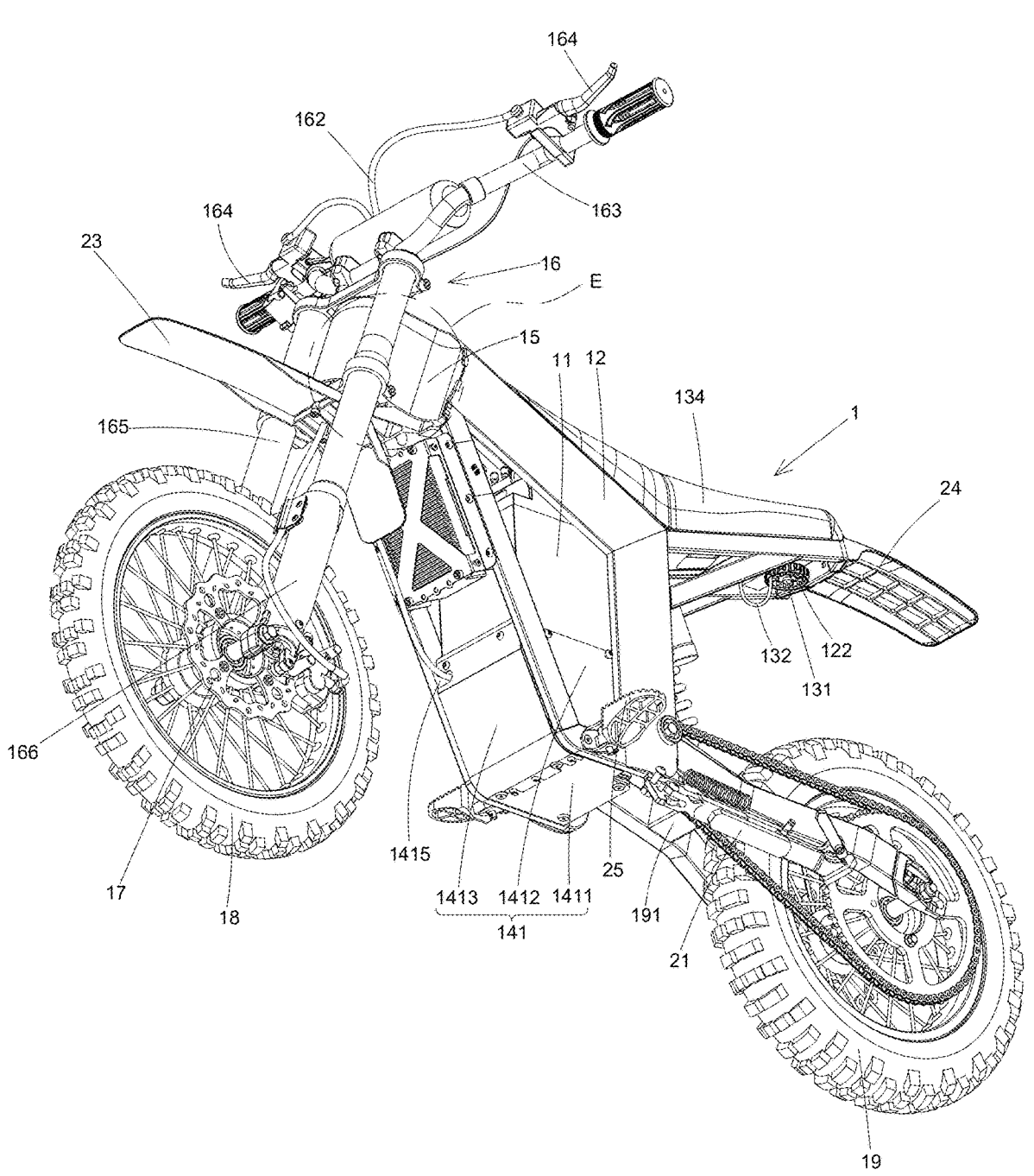
FIG. 1 is a perspective view of an electric motorcycle of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Figure 2:
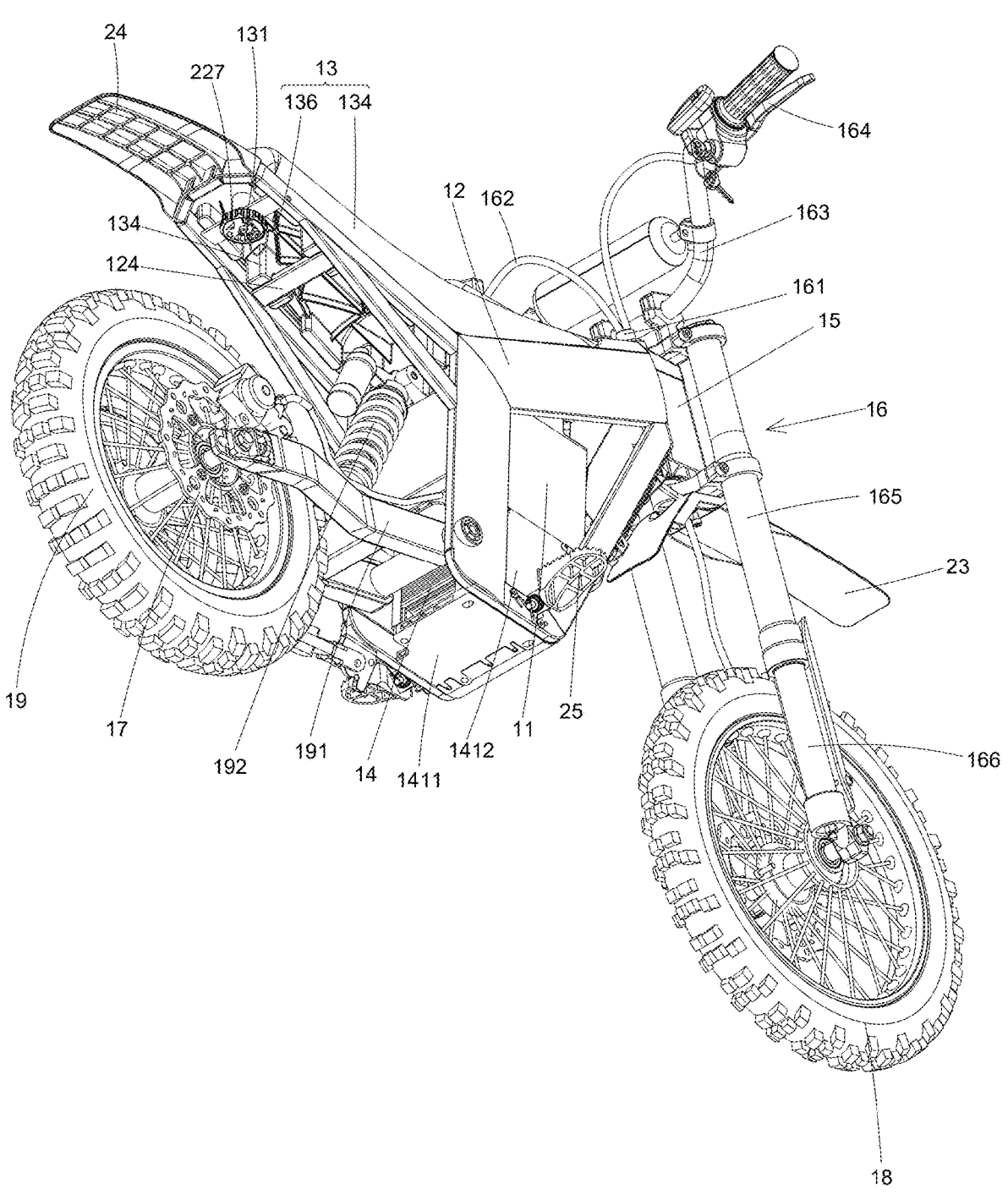
FIG. 2 is a perspective view of an electric motorcycle of the present invention from another angle.
Figure 3:
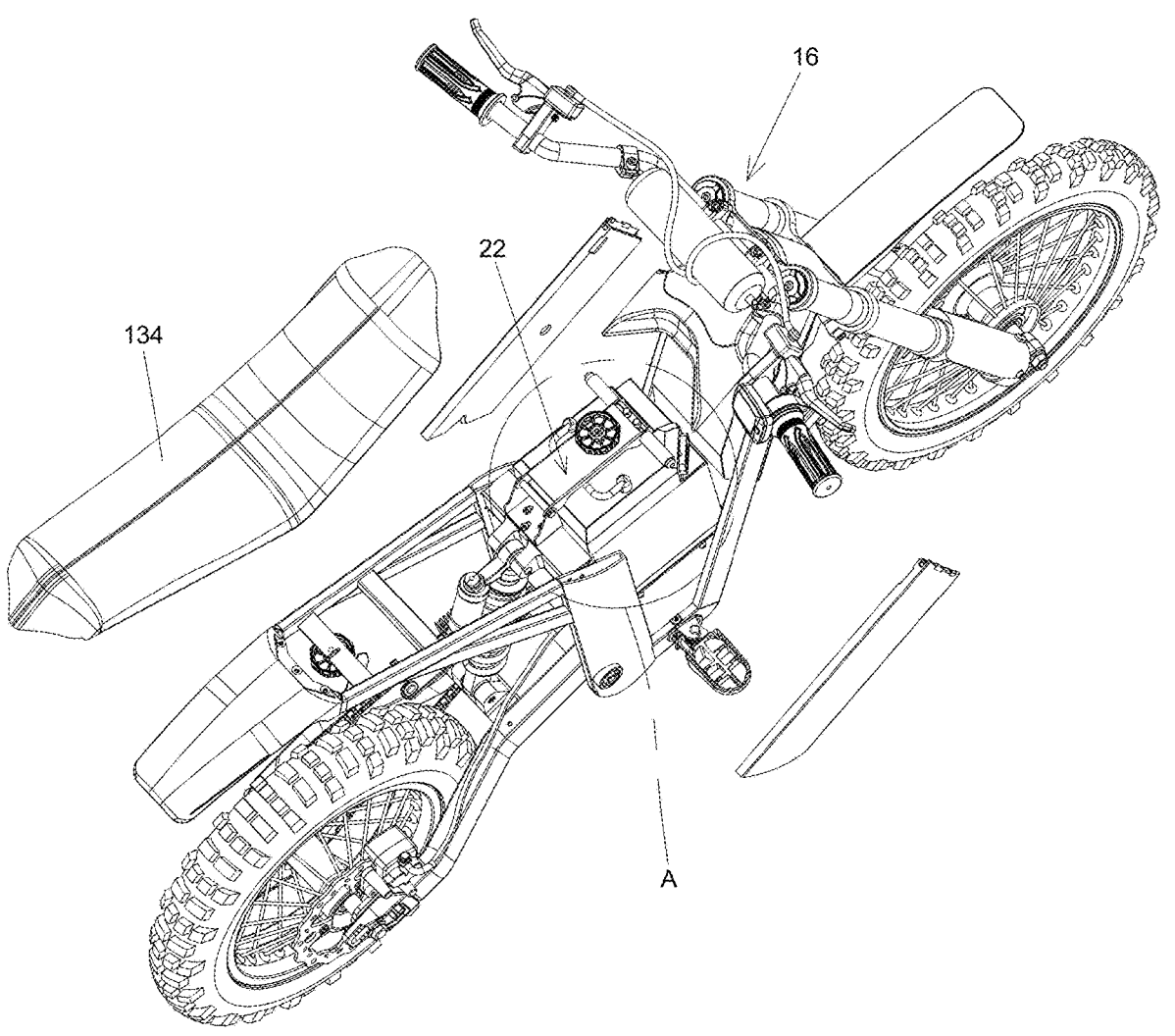
FIG. 3 is a perspective view of an electric motorcycle of the present invention from yet another angle.
Figure 4:
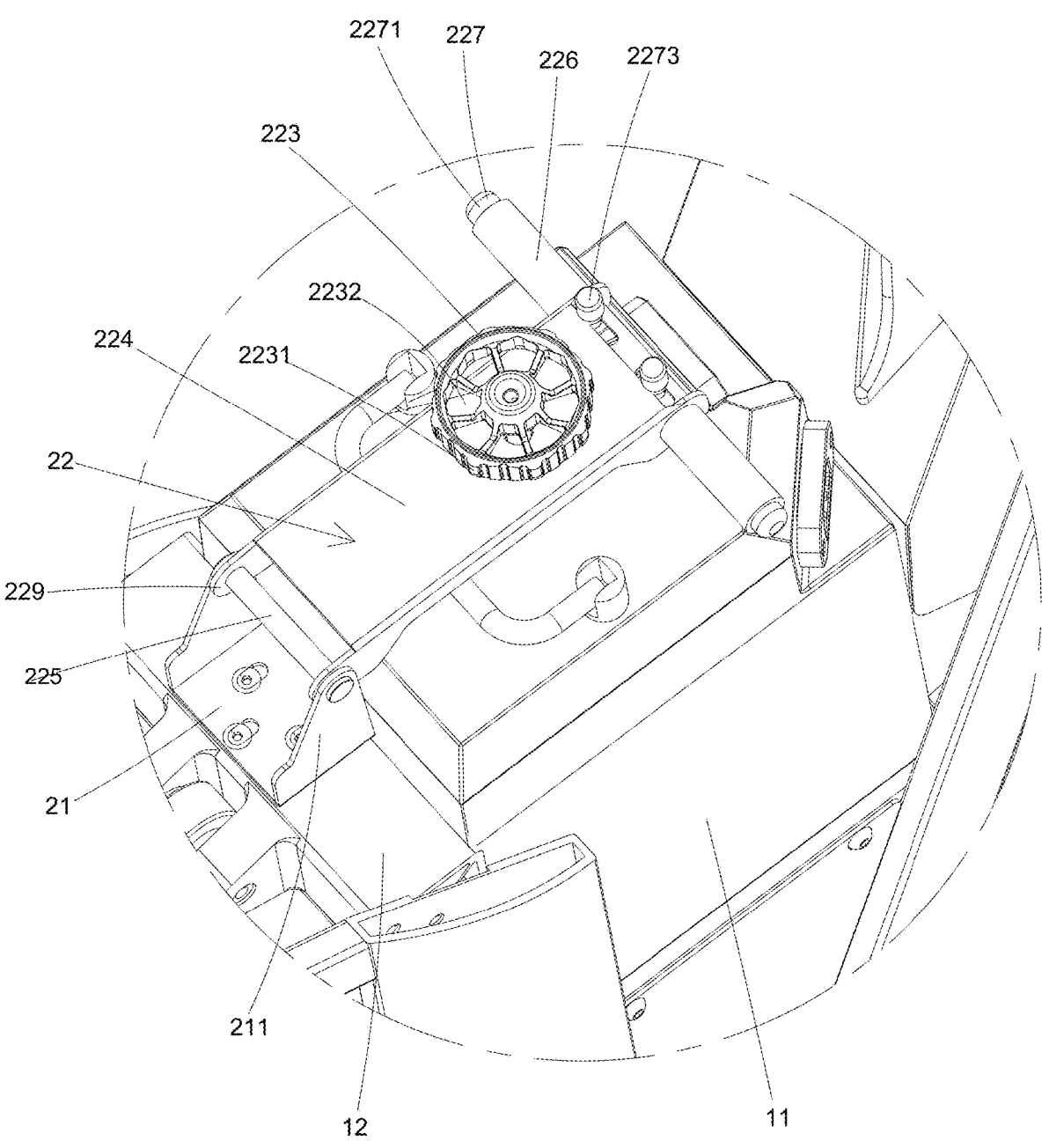
FIG. 4 is an enlarged view of area A in FIG. 3.
Figure 5:
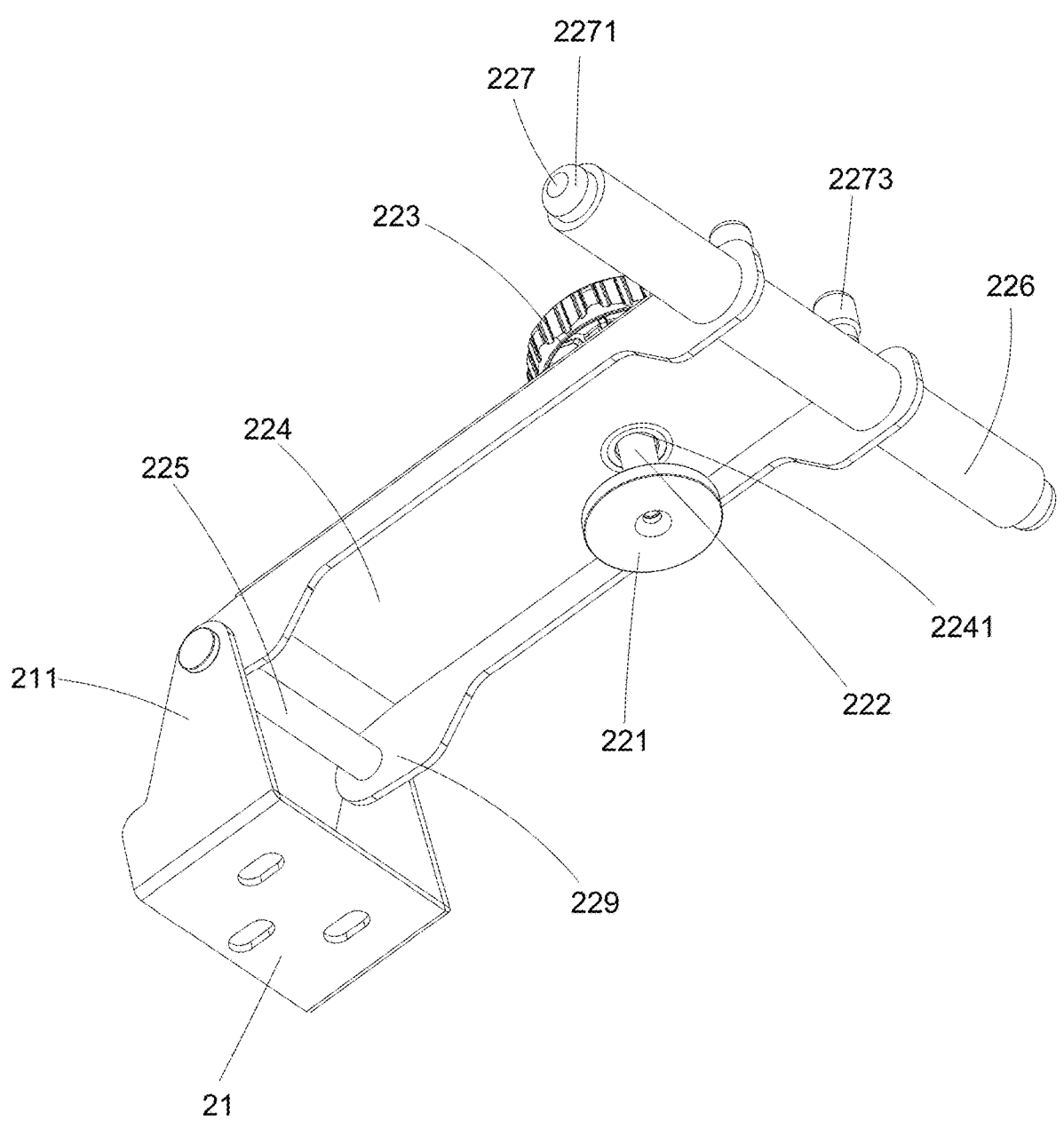
FIG. 5 is a perspective view of a battery fixing device.
Figure 6:
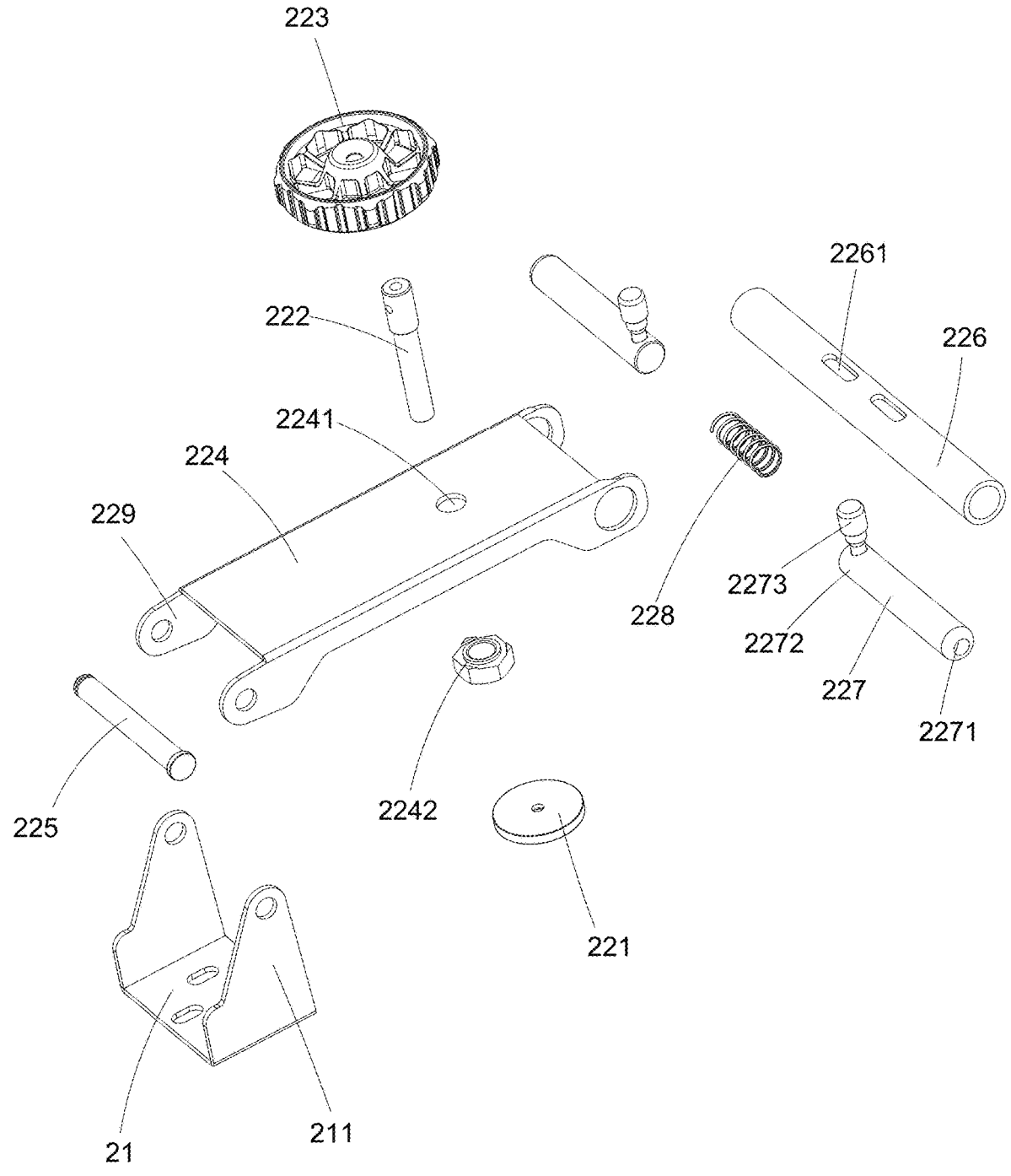
FIG. 6 is an exploded view of a battery fixing device.
Figure 7:
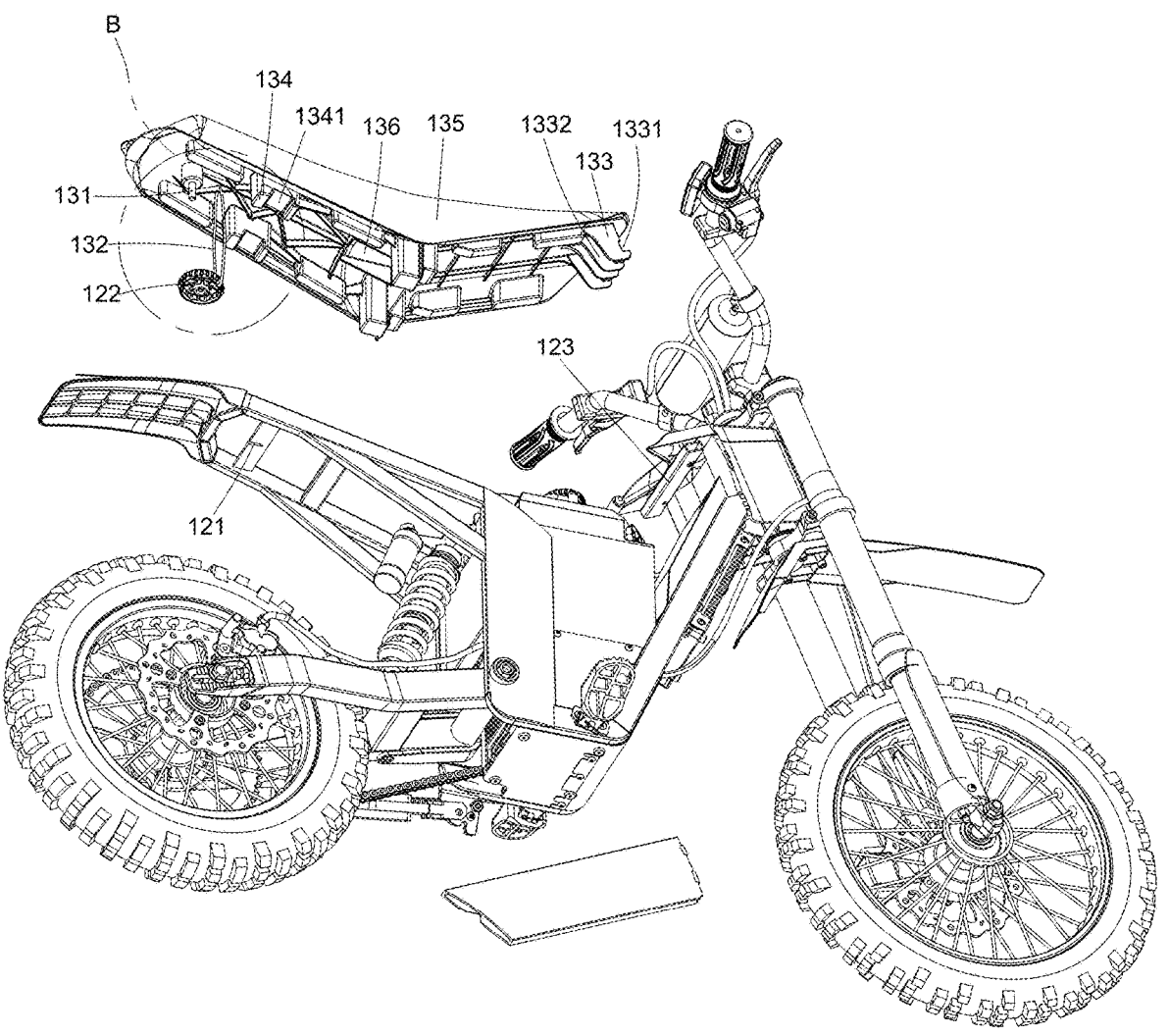
FIG. 7 is an exploded view of an electric motorcycle of the present invention.
Figure 8:
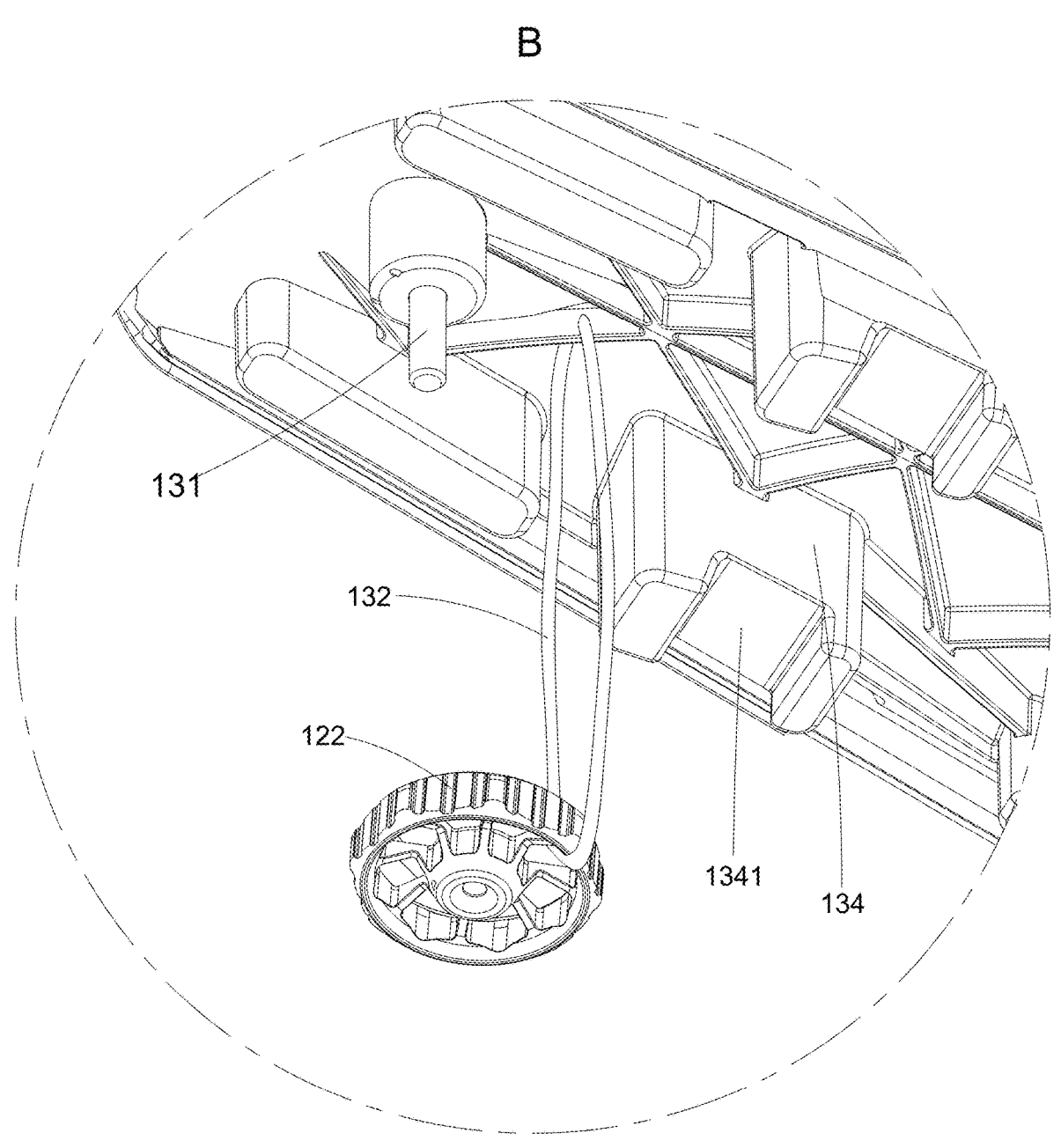
FIG. 8 is an enlarged view of area B in FIG. 7.
Figure 9:
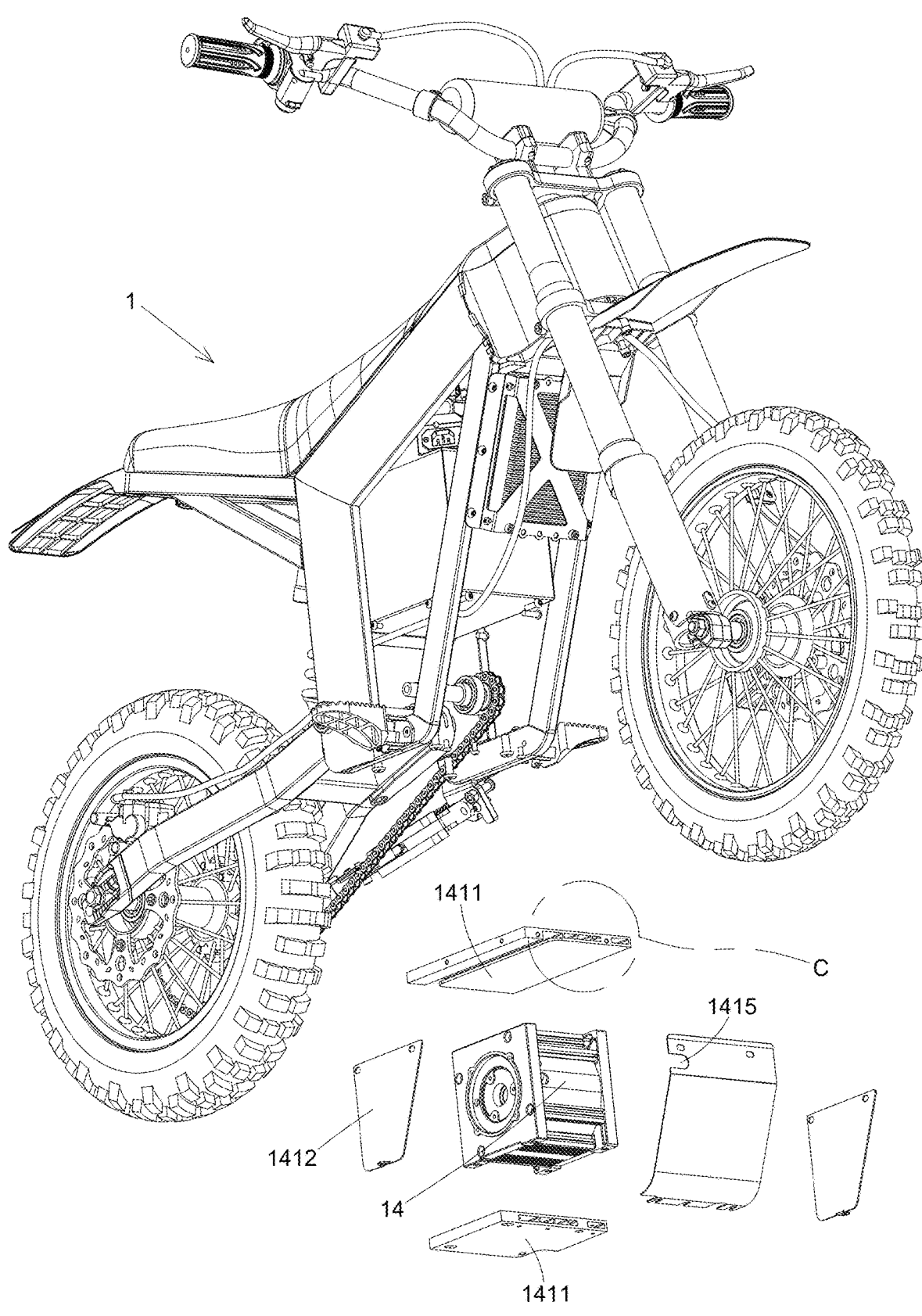
FIG. 9 is another exploded view of an electric motorcycle of the present invention.
Figure 10:
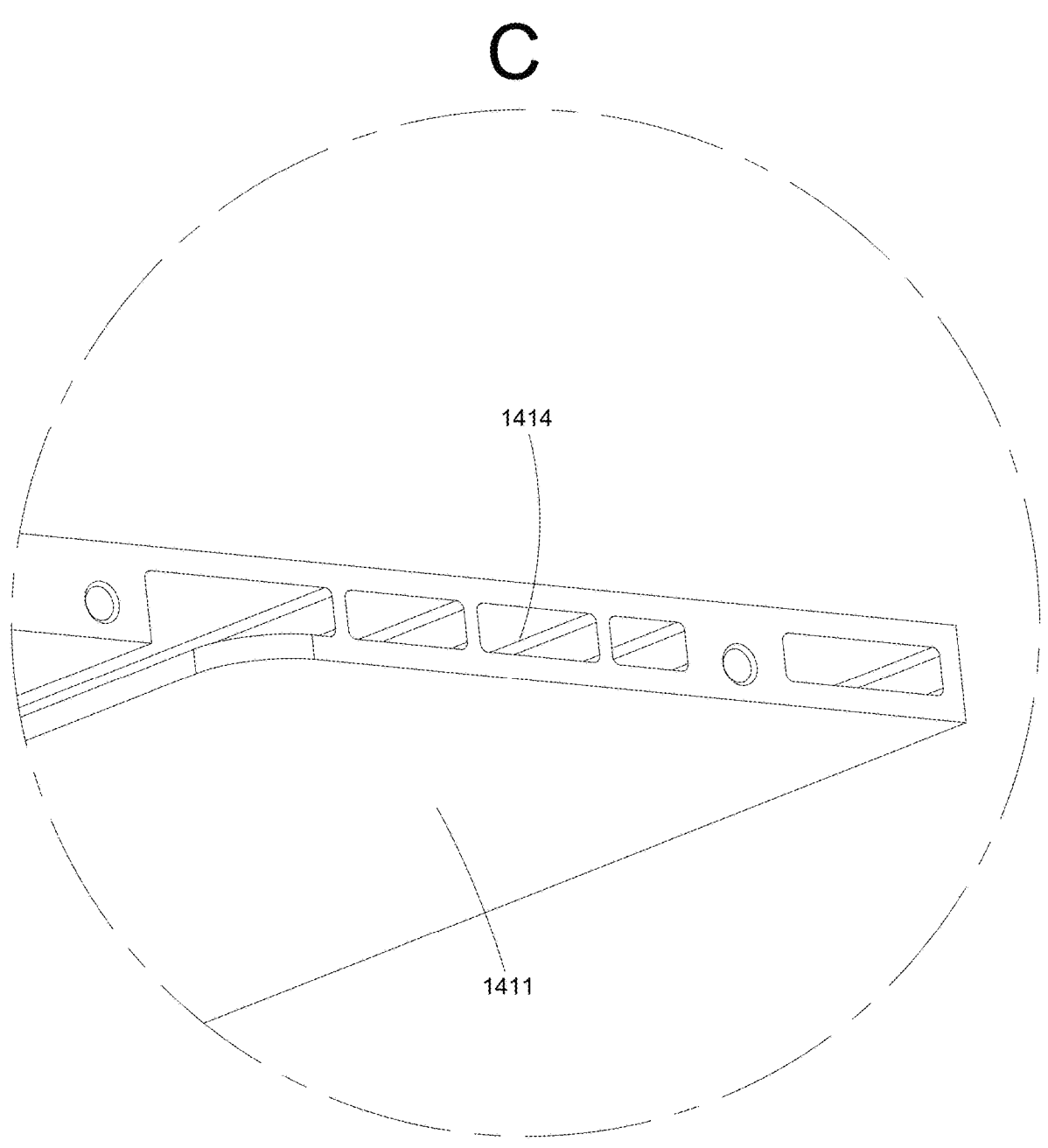
FIG. 10 is an enlarged view of area C in FIG. 9.
Figure 11:
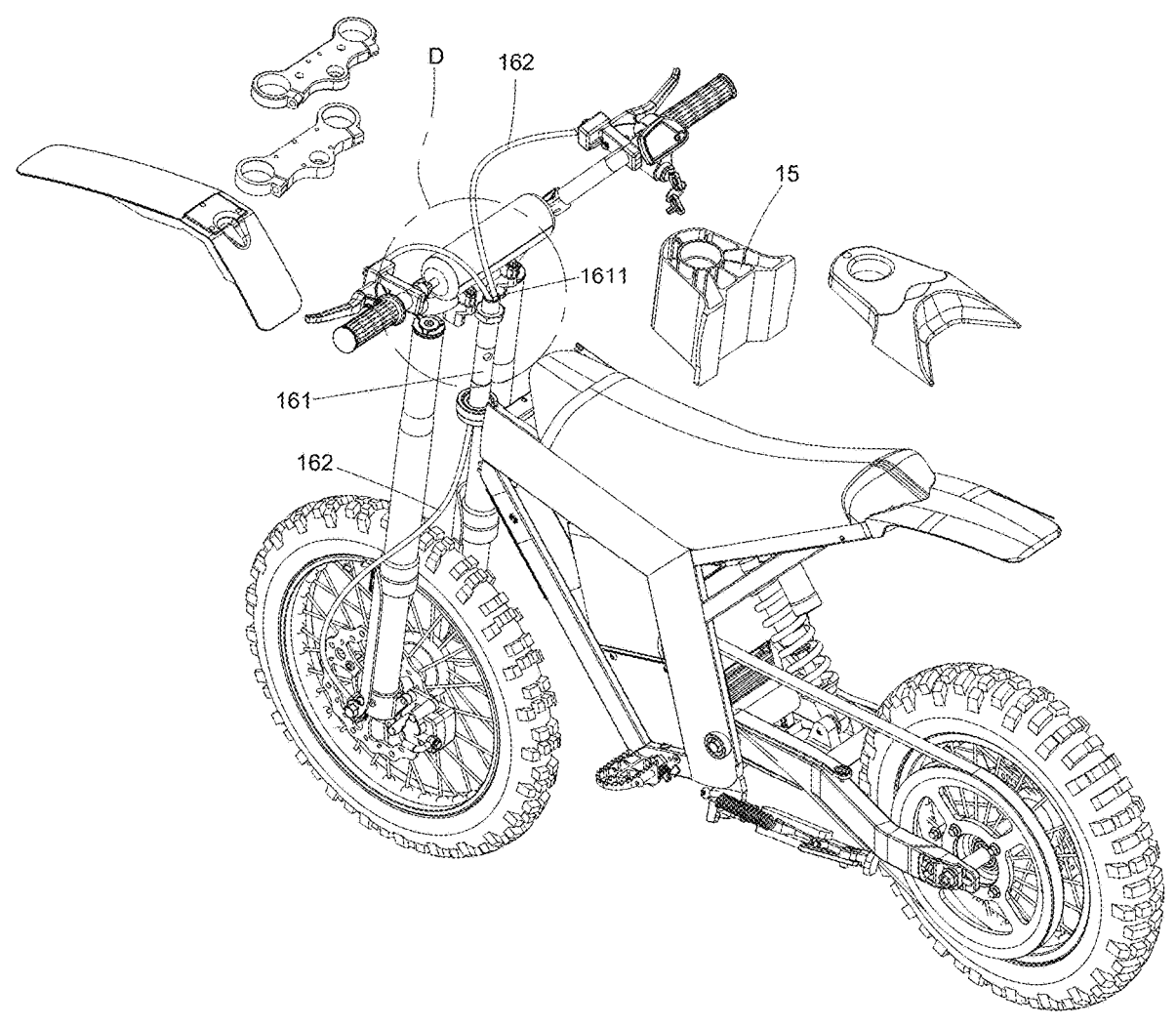
FIG. 11 is yet another exploded view of an electric motorcycle of the present invention.
Figure 12:
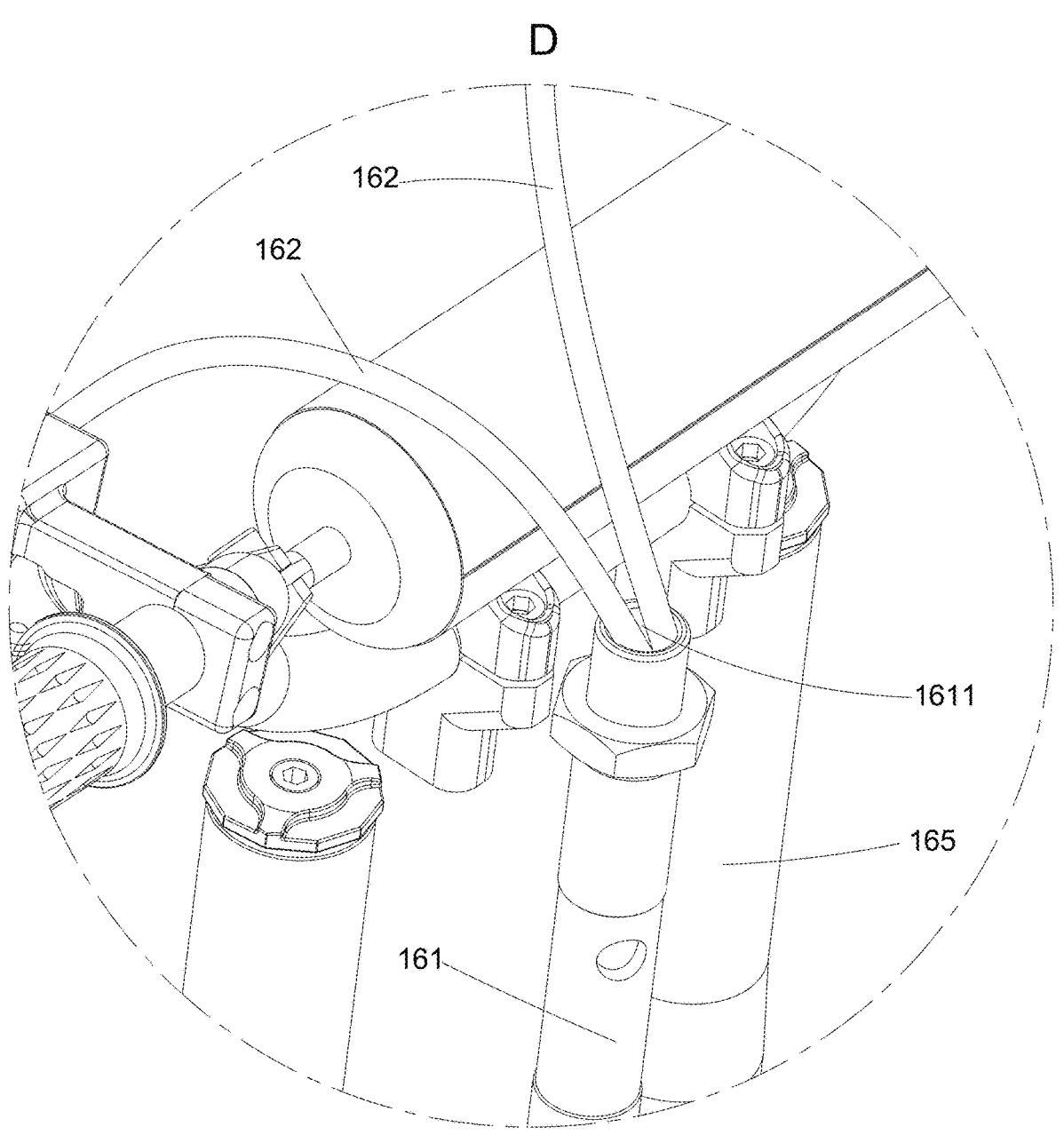
FIG. 12 is an enlarged view of area D in FIG. 11.
Figure 14:
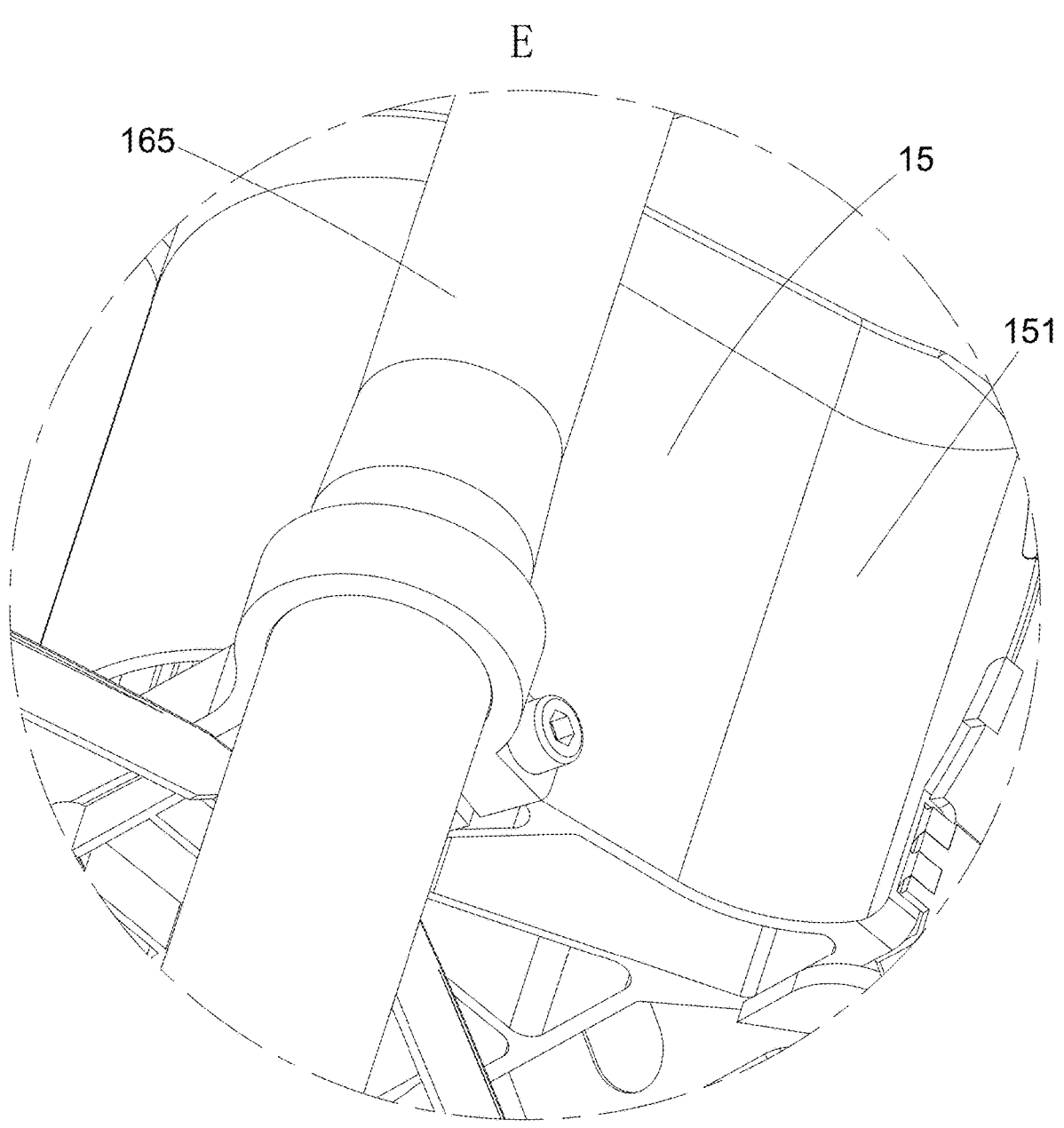
FIG. 14 is an enlarged view of are E in FIG. 1.

Referring to FIGS. 1-14, the present invention provides an electric motorcycle. The electric motorcycle includes a motorcycle main body 1, a battery 11, and at least one battery fixing device 22. The battery 11 is configured to be installed on the motorcycle main body 1. The battery fixing device 22 is connected to the motorcycle main body 1.

The battery fixing device 22 includes a fixing plate 224, a control end 223, an abutting end 221, and a connecting end 222. The fixing plate 224 is connected to the motorcycle main body 1. The connecting end 222 is rotatably connected to the fixing plate 224. One end of the connecting end 222 is connected to the abutting end 221, and an opposite end of the connecting end 222 is connected to the control end 223. The fixing plate 224 is used for covering the battery 11. The abutting end 221 is configured to abut against and secure the battery 11. The control end 223 is operated to make the abutting end 221 approach or move away from the battery 11.

It can be understood that the battery 11 is fixed to the motorcycle main body 1 through the battery fixing device 22. The battery fixing device 22 includes the fixing plate 224, the control end 223, the abutting end 221, and the connecting end 222. The connecting end 222 has a certain length. One end of the connecting end 222 is connected to the abutting end 221, and the opposite end of the connecting end 222 is connected to the control end 223. The connecting end 222 is rotatably connected to the fixing plate 224. The control end 223 can be operated to move the abutting end 221. When the fixing plate 224 covers the battery 11, the control end 223 can be operated to make the abutting end 221 close to the battery 11 until the abutting end 221 is pressed against the battery 11, so that the battery 11 is fastened to the motorcycle main body 1. The control end 223 can be operated to move the abutting end 221 away from the battery 11 until the abutting end 221 disengages from the battery 11, so that the battery 11 can be detached from the motorcycle main body 1. Through the above arrangement, a user can drive the abutting end 221 to move a certain distance by operating the control end 223, so as to dynamically adjust the fixation of the battery 11 according to a size of the battery 11 and an actual usage scenario, meeting the needs of fixing the batteries 11 of various sizes. The operation method is simple, providing the user with great convenience and improving user experience.

Furthermore, the control end 223 includes a plurality of protrusions 2231. The control end 223 further includes a plurality of hollow structures 2232.

It can be understood that the control end 223 includes the plurality of protrusions 2231. The protrusions 2231 are arranged on a surface of the control end 223 to increase friction, making it more convenient and effortless for the user to operate the control end 223, and improving the user experience. The control end 223 further includes the plurality of hollow structures 2232, and the hollow structures 2232 can reduce a weight of the control end 223.

Furthermore, the motorcycle main body 1 includes a frame 12. An accommodating space is defined in the frame 12. The battery 11 is arranged in the accommodating space. The battery fixing device 22 further includes a base 21. The fixing plate 224 is rotatably connected to the base 21, and the base 21 is connected to the frame 12.

It can be understood that the motorcycle main body 1 includes the frame 12. The accommodating space is defined in the frame 12. The battery 11 is arranged in the accommodation space. A first part of the battery 11 abuts against an inner wall of the frame 12, and a second part of the battery 11 is exposed to the air, which can enhance the heat dissipation of the battery 11. The battery fixing device 22 further includes the base 21. The base 21 is connected to the frame 12 through a fastener. The fixing plate 224 is rotatably connected to the base 21. The structural design is simple and durable.

Furthermore, the base 21 includes first connecting arms 211. The fixing plate 224 includes second connecting arms 229. The battery fixing device 22 further includes a connecting shaft 225. The first connecting arm 211 and the second connecting arm 229 are connected via the connecting shaft 225.

It can be understood that the base 21 includes two first connecting arms 211, and the fixing plate 224 includes two second connecting arms 229. The two first connecting arms 211 and the two second connecting arms 229 are connected via the connecting shaft 225, enabling a rotational connection between the base 21 and the fixing plate 224. The structural design is simple and durable.

Furthermore, the fixing plate 224 further includes a first through hole 2241 and a nut 2242. The nut 2242 includes a thread, and the connecting end 222 includes a thread. The connecting end 222 is configured to pass through the first through hole 2241 and is rotatably connected to the nut 2242.

It can be understood that the nut 2242 is fixed on the fixing plate 224, and the connecting end 222 includes a thread. After the connecting end 222 passes through the first through hole 2241, the connecting end 222 is rotatably connected to the nut 2242 with a thread. By rotating the control end 223 in one direction, the connecting end 222 is moved relative to the nut 2242, thereby causing the abutting end 221 to approach the battery 11. Similarly, by rotating the control end 223 in an opposite direction, the connecting end 222 is moved relative to the nut 2242, thereby causing the abutting end 221 to move away from the battery 11. The structure is simple and reliable, the cost is low, and it is easy to achieve mass production.

Furthermore, the battery fixing device 22 further includes a sleeve 226, at least one locking key 227, and an elastic member 228. The locking key 227 and the elastic member 228 are arranged inside the sleeve 226, and the locking key 227 is configured to compress the elastic member 228. A first end 2271 of the locking key 227 protrudes from the sleeve 226. The first end 2271 is configured to be engaged with an external hole to prevent the battery fixing device 22 from rotating.

It can be understood that the battery fixing device 22 further includes the sleeve 226, at least one locking key 227, and the elastic member 228. The sleeve 226 is connected to the fixing plate 224. The locking key 227 and the elastic member 228 are arranged inside the sleeve 226. The locking key 227 abuts against and compresses the elastic member 228, causing the elastic member 228 to be elastic. The first end 2271 of the locking key 227 protrudes from the sleeve 226, and the first end 2271 of the locking key 227 can be engaged into a locking hole of the frame 12, so that the battery fixing device 22 is locked onto the frame 12.

Furthermore, a total number of the locking keys 227 is two.

It can be understood that the two locking keys 227 are respectively arranged on both sides of the battery fixing device, which can make the battery fixing device more secure when locked.

Furthermore, an end of the locking key 227 away from the first end 2271 is a second end 2272. The locking key 227 includes a lever 2273. The lever 2273 is arranged at the second end 2272. The sleeve 226 includes position limiting holes 2261. A total number of the position limiting holes 2261 is two. The lever 2273 is arranged in the position limiting hole 2261.

It can be understood that the locking key 227 includes the lever 2273. The lever 2273 is arranged on the second end 2272. The sleeve 226 includes the position limiting holes 2261. The position limiting hole 2261 is in a long strip shape. The lever 2273 is arranged in the position limiting hole 2261 and can move a certain distance in the position limiting hole 2261. When the lever 2273 is at one end of the position limiting hole 2261, the two locking keys 227 move away from each other, and the first end 2271 of the locking key 227 protrudes from the sleeve 226. When the lever 2273 is at an opposite end of the position limiting hole 2261, the two locking keys 227 approach each other, and the first end 2271 of the locking key 227 moves into the sleeve 226.

Furthermore, the second ends 2272 of the two locking keys 227 abut against the elastic member 228, so that the elastic member 228 is compressed.

It can be understood that the second ends 2272 of the two locking keys 227 abut against the elastic member 228, so that the elastic member 228 is compressed between the two locking keys 227, thereby keeping the elastic member 228 always elastic.

Furthermore, the motorcycle main body 1 includes a frame 12 and a seating portion 13. The seating portion 13 is detachably mounted on the frame 12. The seating portion 13 includes at least one mounting rod 131. The frame 12 includes at least one mounting hole 121. The seating portion 13 is mounted on the frame 12, and the mounting rod 131 is configured to pass through the mounting hole 121. The seating portion 13 further includes a fixing member 122. The fixing member 122 is detachably connected to the mounting rod 131 to lock the seating portion 13 onto the frame 12.

It can be understood that the motorcycle main body 1 includes the frame 12 and the seating portion 13. The seating portion 13 is detachably mounted on the frame 12. The seating portion 13 is used for a user to sit on. The seating portion 13 includes one mounting rod 131 and one fixing member 122. The frame 12 includes one mounting hole 121. When the seating portion 13 is installed on the frame 12, the mounting rod 131 passes through the mounting hole 121, and the fixing member 122 is detachably connected to one end of the mounting rod 131, so that the seating portion 13 is locked to the frame 12. After the fixing member 122 is removed from the mounting rod 131, the user can remove the seating portion 13. The detachable design of the seating portion 13 and the frame 12 is convenient for the user to disassemble and install.

Furthermore, the mounting rod 131 is provided with a thread, and the fixing member 122 includes a thread. The fixing member 122 is rotatably connected to the mounting rod 131.

It can be understood that the mounting rod 131 is provided with a thread, and the fixing member 122 includes a thread. The fixing member 122 is mounted on or detached from the mounting rod 131 by means of rotation. The structure is simple and durable, which is convenient for the user to use.

Furthermore, the seating portion 13 further includes a hanging rope 132. One end of the hanging rope 132 is connected to the seating portion 13, and an opposite end of the hanging rope 132 is connected to the fixing member 122.

It can be understood that the fixing member 122 is connected to the seating portion 13 through the hanging rope 132. When the fixing member 122 is disassembled, the fixing member 122 will be suspended on the seating portion 13 through the hanging rope 132, and will not fall to the ground and cause loss, thereby improving the user experience.

Furthermore, the seating portion 13 includes a seat cushion 135 and a supporting seat 136. The seat cushion 135 is positioned above the supporting seat 136. The supporting seat 136 is detachably connected to the frame 12. The supporting seat 136 includes a first connecting component 133. The first connecting component 133 is positioned at an edge of the supporting seat 136. The first connecting component 133 includes a first clamping groove 1331. The frame 12 includes a first crossbeam 123. The first crossbeam 123 is configured to be clamped in the first clamping groove 1331. The first connecting component 133 includes a plurality of supporting members 1332 disposed at intervals.

It can be understood that the seating portion 13 includes the seat cushion 135 and the supporting seat 136. The seat cushion 135 is positioned above the supporting seat 136. The supporting seat 136 is detachably connected to the frame 12. The user can directly sit on the seat cushion 135, and the seat cushion 135 is made of sponge material, which can enhance the user's sitting experience. The supporting seat 136 includes the first connecting component 133. The first connecting component 133 is positioned at the edge of the supporting seat 136. The first connecting component 133 includes the first clamping groove 1331. The frame 12 includes the first crossbeam 123. When the seating portion 13 is installed on the frame 12, the first crossbeam 123 is clamped in the first clamping groove 1331, which can make the connection between the seating portion 13 and the frame 12 more stable.

Furthermore, the supporting seat 136 further includes a second connecting component 134. The second connecting component 134 includes a second clamping groove 1341. The frame 12 further includes a second crossbeam 124. The second crossbeam 124 is configured to be clamped in the second clamping groove 1341.

It can be understood that the supporting seat 136 further includes the second connecting component 134. The second connecting component 134 includes the second clamping groove 1341. The frame 12 further includes the second crossbeam 124. When the seating portion 13 is installed on the frame 12, the second crossbeam 124 is clamped in the second clamping groove 1341, which can further increase the stability of the connection between the seating portion 13 and the frame 12.

Furthermore, the motorcycle main body 1 further includes a frame 12, a motor 14, and a motor protection structure 141. The motor 14 is arranged on the frame 12 to drive the electric motorcycle. The motor protection structure 141 is arranged outside the motor 14 to protect the motor 14. The motor protection structure 141 is connected to the frame 12.

It can be understood that the motorcycle main body 1 further includes the frame 12, the motor 14, and the motor protection structure 141. The motor 14 is arranged on the frame 12. The motor protection structure 141 is arranged outside the motor 14 and fixedly connected to the frame 12.

The motor protection structure 141 can better protect the motor. During the user's use of the electric motorcycle, the motor protection structure 141 can effectively block the impact of external objects on the motor 14, and also play a certain role in dust and water prevention, making the motor 14 less likely to be damaged.

Furthermore, the motor protection structure 141 includes first protection plates 1411 disposed on an upper side and a lower side of the motor 14, second protection plates 1412 disposed on a left side and a right side of the motor 14, and a third protection plate 1413 disposed on a front side of the motor 14. The first protection plate 1411 includes a plurality of heat conduction grooves 1414. The third protection plate 1413 includes a second through hole 1415 for wiring.

It can be understood that the motor protection structure 141 includes the first protection plates 1411 disposed on the upper side and the lower side of the motor 14, the second protection plates 1412 disposed on the left side and the right side of the motor 14, and the third protection plate 1413 disposed on the front side of the motor 14. The second protection plates 1412 are capable of protecting the left side and the right side of the motor 14. The first protection plates 1411 are capable of protecting the upper side and the lower side of the motor 14. The third protection plate 1413 is capable of protecting the front side of the motor 14. The motor protection structure 141 is not provided with a protection plate on a rear side of the motor, because when the electric motorcycle runs forward, impact objects generally come from the front, upper, lower, left, and right sides. Therefore, not arranging a protection plate at a back portion of the motor 14 can provide an area for heat dissipation at the back portion of the motor 14. The above arrangement can not only maximize the protection of the motor from impact, but also provide a heat dissipation space for the motor 14. The first protection plate 1411 includes the plurality of heat conduction grooves 1414, which can further enhance the heat dissipation of the motor 14. The third protection plate 1413 includes the second through hole 1415 for wiring, thereby facilitating the connection between control wiring and the motor 14.

Furthermore, the motorcycle main body 1 further includes a frame 12, a connecting portion 15, a steering component 16, a motor 14, and a brake component 17. One end of the connecting portion 15 is connected to the frame 12, and an opposite end of the connecting portion 15 is connected to the steering component 16. The steering component 16 includes a steering shaft 161 and a control wire 162. The control wire 162 is connected to the motor 14 and the brake component 17. The steering shaft 161 includes a wiring channel 1611, and the control wire 162 is configured to pass through the wiring channel 1611.

It can be understood that the motorcycle main body 1 further includes the frame 12, the connecting portion 15, the steering component 16, the motor 14, and the brake component 17. The frame 12 is connected to the steering component 16 through the connecting portion 15. The steering component 16 includes the steering shaft 161 and the control wire 162. The control wire 162 includes wiring for controlling the brake component 17 and wiring for controlling the motor 14. The steering shaft 161 includes the wiring channel 1611. The control wire 162 passes through the wiring channel 1611, so that the control wire 162 can be better protected, the control wire 162 will not be damaged during use, and the esthetics can be improved.

Furthermore, the steering component 16 further includes a handlebar 163, a control component 164, a front fork arm 165, and a front shock absorber 166. The motorcycle main body 1 further includes a front wheel 18. The control component 164 is arranged on the handlebar 163. The control component 164 is connected to the control wire 162 to control the motor 14 and the brake component 17. The front fork arm 165, the handlebar 163, and the steering shaft 161 are connected. One end of the front shock absorber 166 is connected to the front wheel 18, and an opposite end of the front shock absorber 166 is connected to the front fork arm 165. The brake component 17 is arranged on the front wheel 18. The front fork arm 165 is not perpendicular to the ground.

It can be understood that the steering component 16 further includes the handlebar 163, the control component 164, the front fork arm 165, and the front shock absorber 166. A total number of the control components 164 is at least two. The two control components 164 are respectively arranged at both ends of the handlebar 163. The two control components 164 respectively control a throttle and a brake of the electric motorcycle. One end of the front shock absorber 166 is connected to the front wheel 18, and the opposite end of the front shock absorber 166 is connected to the front fork arm 165. The front shock absorber 166 can better reduce the vibration caused by the front wheel 18 during driving and improve the user experience. The front fork arm 165, the handlebar 163, and the steering shaft 161 are connected, and the user can use the handlebar 163 to control the steering of the front wheel 18. The brake component 17 is arranged on the front wheel 18, and the user can brake the front wheel 18 by controlling the brake component 17. The front fork arm 165 is not perpendicular to the ground, and has a certain inclination angle relative to the ground, which can improve better vehicle body stability and better shock absorption effect when the user rides the electric motorcycle.

Furthermore, the motorcycle main body 1 further includes a rear wheel 19, a rear fork arm 191, and a rear shock absorber 192. One end of the rear fork arm 191 is connected to the frame 12, and an opposite end of the rear fork arm 191 is connected to the rear wheel 19. One end of the rear shock absorber 192 is connected to the frame 12, and an opposite end of the rear shock absorber 192 is connected to the rear fork arm 191. The brake component 17 is arranged on the rear wheel 19.

It can be understood that the rear wheel 19 is connected to the frame 12 through the rear fork arm 191. One end of the rear shock absorber 192 is connected to the frame 12, and the opposite end of the rear shock absorber 192 is connected to the rear fork arm 191, which can better reduce the vibration caused by the rear wheel 19 during driving and improve the user experience. The brake component 17 is arranged on the rear wheel 19, and the user can control the brake component 17 to brake the rear wheel 19.

Furthermore, the motorcycle main body 1 further includes a supporting foot 21. The supporting foot 21 is rotatably connected to the frame 12 to support the electric motorcycle. The motorcycle main body 1 further includes a pedal 25. The pedal 25 is arranged on the frame 12. The motorcycle main body 1 further includes a front fender 23 and a rear fender 24.

It can be understood that when the user needs to park, the supporting foot 21 can be rotated towards the ground, and the supporting foot 21 can support the electric motorcycle to stand up. By arranging the pedal 25 on the frame 12, it is convenient for the user to place both feet on the pedal 25 while riding the electric motorcycle, providing a better user experience. The front fender 23 is capable of blocking the dirt rolled up by the front wheel 18 when the electric motorcycle is running, and the rear fender 24 is capable of blocking the dirt rolled up by the rear wheel 19 when the electric motorcycle is running.

Furthermore, the motorcycle main body 1 further includes a frame 12, a connecting portion 15, and a steering component 16. One end of the connecting portion 15 is connected to the frame 12, and an opposite end of the connecting portion 15 is connected to the steering component 16. Two sides of the connecting portion 15 include inwardly recessed avoidance grooves 151. The connecting portion 15 is made of aluminum alloy.

It can be understood that the motorcycle main body 1 further includes the frame 12, the connecting portion 15, and the steering component 16. The steering component 16 includes the steering shaft 161 and the front fork arm 165. One end of the connecting portion 15 is connected to the frame 12, and the opposite end of the connecting portion 15 is connected to the steering component 16. The front fork arm 165 is connected to the steering shaft 161. The front fork arm 165 is positioned on both sides of the connecting portion 15. The two sides of the connecting portion 15 include the inwardly recessed avoidance grooves 151. When the user turns the electric motorcycle to a maximum angle, the front fork arm 165 will approach the avoidance grooves 151 on both sides of the connecting portion 15, but will not abut against the connecting portion 15. With the above structural arrangement, the inwardly recessed avoidance grooves 151 in both sides of the connecting portion 15 can provide a larger range of movement for the front fork arm 165, thereby increasing the steering angle of the electric motorcycle, improving the performance, and increasing the user experience. The connecting portion 15 is made of aluminum alloy, and the connecting portion 15 further includes a plurality of hollow structures, which can reduce the weight of the connecting portion 15 and thus reduce the overall weight of the electric motorcycle.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. An electric motorcycle, comprising:
   a motorcycle main body;
   a battery; and
   at least one battery fixing device;
   wherein the battery is configured to be installed on the motorcycle main body; and
the battery fixing device is connected to the motorcycle main body;
   the battery fixing device comprises a fixing plate, a control end, an abutting end, and a connecting end; the fixing plate is connected to the motorcycle main body; the connecting end is rotatably connected to the fixing plate; one end of the connecting end is connected to the abutting end; an opposite end of the connecting end is connected to the control end; the fixing plate is used for covering the battery; the abutting end is configured to abut against and secure the battery; and the control end is operated to make the abutting end approach or move away from the battery;
   wherein the control end comprises a plurality of protrusions; and the control end further comprises a plurality of hollow structures.

2. The electric motorcycle according to claim 1, wherein the battery fixing device further comprises a sleeve, at least one locking key, and an elastic member; the at least one locking key and the elastic member are arranged inside the sleeve; the at least one locking key is configured to compress the elastic member; a first end of the at least one locking key protrudes from the sleeve; the first end is configured to be engaged with an external hole to prevent the battery fixing device from rotating.

3. The electric motorcycle according to claim 2, wherein a total number of the at least one locking key is two.

4. The electric motorcycle according to claim 3, wherein in each of the two locking keys, an end of the locking key away from a first end is a second end; the locking key comprises a lever; the lever is arranged at the second end; the sleeve comprises position limiting holes; a total number of the position limiting holes is two; and the levers of the two locking keys are arranged in the two position limiting holes respectively.

5. The electric motorcycle according to claim 4, wherein the second ends of the two locking keys abut against the elastic member, so that the elastic member is compressed.

6. The electric motorcycle according to claim 1, wherein the motorcycle main body comprises a frame and a seating portion; the seating portion is detachably mounted on the frame; the seating portion comprises at least one mounting rod; the frame comprises at least one mounting hole; the seating portion is mounted on the frame; the mounting rod is configured to pass through the mounting hole; the seating portion further comprises a fixing member; and the fixing member is detachably connected to the mounting rod to lock the seating portion onto the frame.

7. The electric motorcycle according to claim 6, wherein the mounting rod is provided with a thread; the fixing member comprises a thread; and the fixing member is rotatably connected to the mounting rod.

8. The electric motorcycle according to claim 6, wherein the seating portion further comprises a hanging rope; one end of the hanging rope is connected to the seating portion; and an opposite end of the hanging rope is connected to the fixing member.

9. The electric motorcycle according to claim 6, wherein the seating portion comprises a seat cushion and a supporting seat; the seat cushion is positioned above the supporting seat; the supporting seat is detachably connected to the frame; the supporting seat comprises a first connecting component; the first connecting component is positioned at an edge of the supporting seat; the first connecting component comprises a first clamping groove; the frame comprises a first crossbeam; the first crossbeam is configured to be clamped in the first clamping groove; and the first connecting component comprises a plurality of supporting members disposed at intervals.

10. The electric motorcycle according to claim 9, wherein the supporting seat further comprises a second connecting component; the second connecting component comprises a second clamping groove; the frame further comprises a second crossbeam; and the second crossbeam is configured to be clamped in the second clamping groove.

11. The electric motorcycle according to claim 1, wherein the motorcycle main body further comprises a frame, a motor, and a motor protection structure; the motor is arranged on the frame to drive the electric motorcycle; the motor protection structure is arranged outside the motor to protect the motor; and the motor protection structure is connected to the frame.

12. The electric motorcycle according to claim 11, wherein the motor protection structure comprises first protection plates disposed on an upper side and a lower side of the motor, second protection plates disposed on a left side and a right side of the motor, and a third protection plate disposed on a front side of the motor; the first protection plate comprises a plurality of heat conduction grooves; and the third protection plate comprises a second through hole for wiring.

13. The electric motorcycle according to claim 1, wherein the motorcycle main body further comprises a frame, a connecting portion, a steering component, a motor, and a brake component; one end of the connecting portion is connected to the frame; an opposite end of the connecting portion is connected to the steering component; two sides of the connecting portion comprise inwardly recessed avoidance grooves; the connecting portion is made of aluminum alloy; the steering component comprises a steering shaft and a control wire; the control wire is connected to the motor and the brake component; the steering shaft comprises a wiring channel; and the control wire is configured to pass through the wiring channel.

14. The electric motorcycle according to claim 13, wherein the steering component further comprises a handlebar, a control component, a front fork arm, and a front shock absorber; the motorcycle main body further comprises a front wheel; the control component is arranged on the handlebar; the control component is connected to the control wire to control the motor and the brake component; the front fork arm, the handlebar, and the steering shaft are connected; one end of the front shock absorber is connected to the front wheel; an opposite end of the front shock absorber is connected to the front fork arm; the brake component is arranged on the front wheel; and the front fork arm is not perpendicular to the ground.

15. The electric motorcycle according to claim 13, wherein the motorcycle main body further comprises a rear wheel, a rear fork arm, and a rear shock absorber; one end of the rear fork arm is connected to the frame; an opposite end of the rear fork arm is connected to the rear wheel; one end of the rear shock absorber is connected to the frame; an opposite end of the rear shock absorber is connected to the rear fork arm; the brake component is arranged on the rear wheel; the motorcycle main body further comprises a supporting foot; the supporting foot is rotatably connected to the frame to support the electric motorcycle; the motorcycle main body further comprises a pedal; the pedal is arranged on the frame; and the motorcycle main body further comprises a front fender and a rear fender.

16. The electric motorcycle according to claim 1, wherein the motorcycle main body further comprises a frame, a connecting portion, and a steering component; one end of the connecting portion is connected to the frame; an opposite end of the connecting portion is connected to the steering component; two sides of the connecting portion comprise inwardly recessed avoidance grooves; and the connecting portion is made of aluminum alloy.

14

17. An electric motorcycle, comprising:
a motorcycle main body;
a battery; and
at least one battery fixing device;
wherein the battery is configured to be installed on the motorcycle main body; and
the battery fixing device is connected to the motorcycle main body;
the battery fixing device comprises a fixing plate, a control end, an abutting end, and a connecting end; the fixing plate is connected to the motorcycle main body; the connecting end is rotatably connected to the fixing plate; one end of the connecting end is connected to the abutting end; an opposite end of the connecting end is connected to the control end; the fixing plate is used for covering the battery; the abutting end is configured to abut against and secure the battery; and the control end is operated to make the abutting end approach or move away from the battery;
wherein the motorcycle main body comprises a frame; an accommodating space is defined in the frame; the battery is arranged in the accommodating space; the battery fixing device further comprises a base; the fixing plate is rotatably connected to the base; and the base is connected to the frame;
wherein the base comprises first connecting arms; the fixing plate comprises second connecting arms; the battery fixing device further comprises a connecting shaft; and the first connecting arms and the second connecting arms are connected via the connecting shaft.

18. An electric motorcycle, comprising:
a motorcycle main body;
a battery; and
at least one battery fixing device;
wherein the battery is configured to be installed on the motorcycle main body; and
the battery fixing device is connected to the motorcycle main body;
the battery fixing device comprises a fixing plate, a control end, an abutting end, and a connecting end; the fixing plate is connected to the motorcycle main body; the connecting end is rotatably connected to the fixing plate; one end of the connecting end is connected to the abutting end; an opposite end of the connecting end is connected to the control end; the fixing plate is used for covering the battery; the abutting end is configured to abut against and secure the battery; and the control end is operated to make the abutting end approach or move away from the battery;
wherein the fixing plate further comprises a first through hole and a nut; the nut comprises a thread; the connecting end comprises a thread; and the connecting end is configured to pass through the first through hole and is rotatably connected to the nut.

* * * * *